April 16, 1935.  S. L. HEIDRICH  1,997,790
ACOUSTIC DIAPHRAGM
Filed March 7, 1931  5 Sheets-Sheet 1

Inventor
Stephen L. Heidrich

April 16, 1935.  S. L. HEIDRICH  1,997,790
ACOUSTIC DIAPHRAGM
Filed March 7, 1931  5 Sheets-Sheet 2

Inventor
Stephen L. Heidrich

April 16, 1935.  S. L. HEIDRICH  1,997,790
ACOUSTIC DIAPHRAGM
Filed March 7, 1931   5 Sheets-Sheet 3

Inventor
Stephen L. Heidrich

April 16, 1935.  S. L. HEIDRICH  1,997,790
ACOUSTIC DIAPHRAGM
Filed March 7, 1931  5 Sheets-Sheet 4
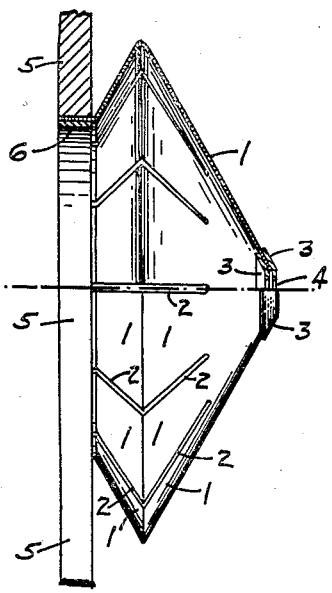
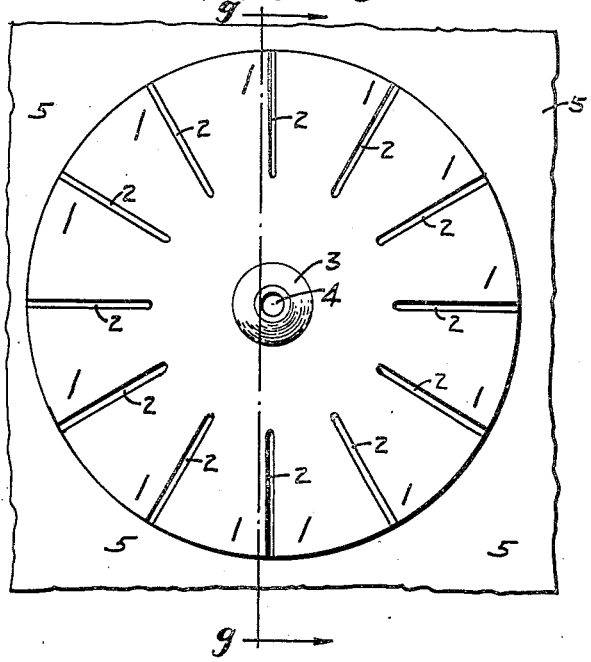
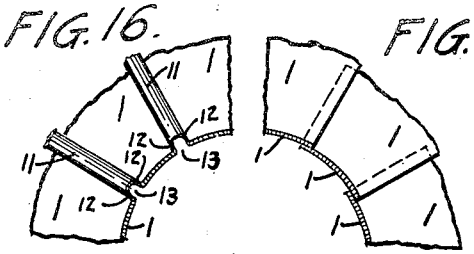
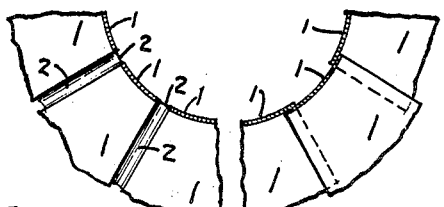
Inventor
Stephan L. Heidrich April 16, 1935.  S. L. HEIDRICH  1,997,790
ACOUSTIC DIAPHRAGM
Filed March 7, 1931   5 Sheets-Sheet 5

Inventor
Stephen L. Heidrich

Patented Apr. 16, 1935

1,997,790

UNITED STATES PATENT OFFICE 1,997,790

ACOUSTIC DIAPHRAGM

Stephen L. Heidrich, Brooklyn, N. Y.

Application March 7, 1931, Serial No. 520,840

14 Claims. (Cl. 181—31)

My invention relates to those arts in which in the production of sound for a useful purpose there is in association with co-operating sound regenerating apparatus a vibratile diaphragm setting forth sound waves, and also in such apparatus in which sound waves are picked up through the intermediation of a vibratile diaphragm.

My invention is applicable as improvements in acoustic diaphragms constructed of paper, thin metal, aluminum, celluloid, impregnated fabric, molded fibre, composition, thin wood, hard rubber or any material of similar characteristics.

My invention is intended as a device for use especially in radio loud speakers, phonographic reproducers, sound collectors and phonographic recording, also in other sound radiating apparatus and such apparatus emitting calling or warning sounds, automobile horns and such, also in electrically operated orchestral devices, and also in sound detectors as used in submarine signaling and in detection of aeroplanes, and also in telephone receivers and transmitters.

The object of my invention is to produce an extremely sensitive acoustic diaphragm that will respond efficiently to the entire range of audible sound frequencies including the attendant harmonic and overtone frequencies, without distortion of sound and to project sound with great loudness and power with a minimum of expended energy and economy of power when used as a sound radiator.

Another object of my invention is to produce an acoustic diaphragm that responds accurately to the impinged sound waves and vibrations over a greater frequency range.

In one of its forms my invention consists of a pyramidal structure having sides comprising a plurality of free thin flat sectors of resilient material such as paper, impregnated fabric, thin wood or metal, but deflected from a true plane in a radial direction, assembled on a peripheral frame supporting member having a free opening, said sectors converging to an apex and there secured to a cap member or other means for connection to actuating means. Use of the pyramidal feature of construction having thin flat flexible sectors deflected in a radial direction is for establishing a state of initial flexure in the diaphragm, thereby providing a state of resiliency to impinged sound vibrations in said diaphragm.

It is known that in conical or conoidal acoustic diaphragms as made heretofore that the very nature of the curved walls resists the flexing tendency in the walls of the cone due to circumferential restraint or tension and thus the cone is compelled to vibrate more or less as a body and with a minimum of deformation. Also in conical and conoidal diaphragms as heretofore used there is usually a yieldable peripheral rim secured to a rigid ring support and in operation the conical portion moves bodily within the limits of resiliency of this yieldable rim. The sound vibrations emitted from this type of acoustic diaphragm are damped to an appreciable degree due to the restraining influence of the rim.

In the pyramidal embodiment I depend more on the resilient flexing in radial directions of the area of each sector of the pyramidal surfaces. The surface of this diaphragm flexes in unison of its parts, each sector moving without restraint from the opposing action of the adjacent sector as I maintain a space free from interference between, that is intermediate the abutting sectors. Thus is produced an acoustic diaphragm that deforms and resiliently under impact of sound vibrations.

In acoustic diaphragms it is preferable for best results and operation that the diaphragm be imperforate, that is without any appreciable aperture through which the air may escape from one side of the diaphragm to the other during its reciprocations. Now in a perforate slitted diaphragm it is necessary to maintain a non rigid zone intermediate the opposing edges of the gap, so that opposing motions of said opposing edges will not interfere and restrain each other. In order to provide the equivalent of this non rigid zone and at the same time make the diaphragm air tight, I insert or otherwise apply a web or membrane of yieldable or elastic material across and closing the gap and seal or cement this web or membrane into place with an air tight joint to the opposing edges bounding the gap. Thus, the diaphragm is made to operate as intended and is air tight. These yieldable or elastic membraneous web spacing elements may consist of a web or membrane of some elastic material as rubber, or said yieldable element may consist of a fold or corrugations of some soft yieldable or pliable material as soft leather or chamois skin, or again, instead of either of the above mentioned means a sliding lapping arrangement of adjacent sectors may be utilized, it being important in this latter case that the lap be snug and air tight but as near frictionless as possible and without opposing pressures restraining the action of the diaphragm. I have found however that a membrane of elastic material across these gaps accomplishes the object of my invention most effectively.

It is practicable and desirable to use features of my invention as improvements in connection with conical and conoidal acoustic diaphragms and also in disc diaphragms, increasing the efficiency of said types of diaphragms. The introduction of slits in conical and conoidal and disc diaphragms does attain a distinct improvement of efficiency in the said conical and conoidal diaphragms and disc diaphragms when used in connection with suitable cooperating apparatus. In other words, in connection with acoustic diaphragms of the conical, conoidal, and disc type my invention consists of improvements consisting of the perforation of the diaphragm with a series or a plurality of slits and incorporated in said slits an elastic membrane or connecting element.

In the accompanying drawings are shown illustrations of several of the embodiments of my invention. In the drawings:—

Fig. 1 is a rear view with a portion of one half cut away to show the construction of one embodiment of my invention showing same as a flat sided pyramidal diaphragm composed of a plurality of sector portions. Fig. 2 shows an upper one half cross section of Fig. 1 on line a—a, showing rib sectors having an angular or oblique deflection in a radial direction; and the lower half shows a similar section but with said rib sector portions curved in a radial direction. Fig. 3 is a rear view of another embodiment of my invention showing same in combination with a conical diaphragm and shown with a portion cut away to reveal the construction at the slitted portion of same. Fig. 4 is a cross section on line b—b. Fig. 5 is a rear view of still another pyramidal modification of my invention but having within the outer peripheral edge a substantial bulge as further illustrated in Fig. 6. Fig. 6 is a one half section of Fig. 5 on line c—c showing in the upper half a curved forward bulge beyond the supported peripheral edge, and showing in the lower half a similar bulge but of angular form. Fig. 7 shows another embodiment of my invention with convex bulging sides as shown in Fig. 8. Fig. 8 is a section of the rear view Fig. 7 on line d—d showing the convex bulging contour of this embodiment.

Fig. 13 is a rear view of still another embodiment of my invention having a substantial convex bulge outward and beyond the peripheral supporting plane and in a plane perpendicular to the axial direction of said diaphragm.

Figure 20:
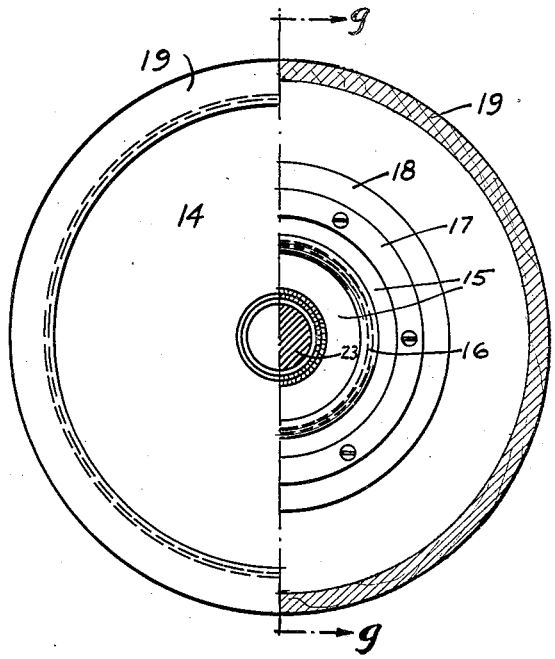
Figure 19:
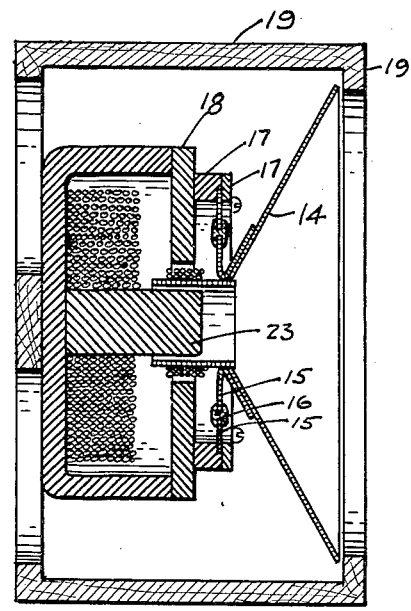
Figure 22:
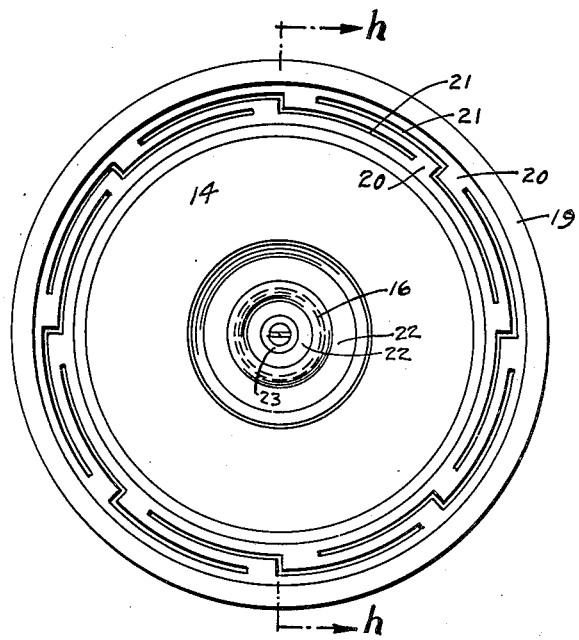
Figure 21:
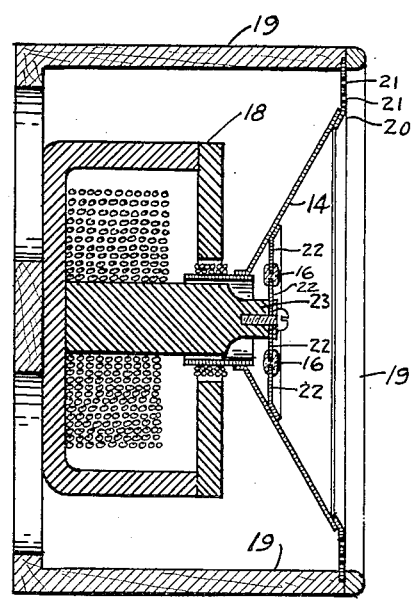

Fig. 14 shows a section of Fig. 13 on line g—g for the upper half, and a side view of Fig. 13 of the lower half, and illustrating the outward bulge of this embodiment of my invention. Figs. 15, 16, 17 and 18 show fragmentary views of several means of obtaining a condition of nonrigidity interjacent a plurality of portions. Figures 19, 20, 21 and 22 show preferred methods of using features of my invention in connection with loud speakers of the well known dynamic type. Fig. 19 is a section on line g—g of Fig. 20 showing a dynamic loud speaker unit with a free rim cone diaphragm. Fig. 20 shows a front view of same with part of cone portion cut away to show the supported disc portion of the diaphragm in back of the cone. Fig. 21 is a section on line h—h of Fig. 22 and is also a section of a dynamic loud speaker unit but with a flexible rim portion from which the cone is partly suspended. Fig. 22 is a front view of same.

Figure 12:
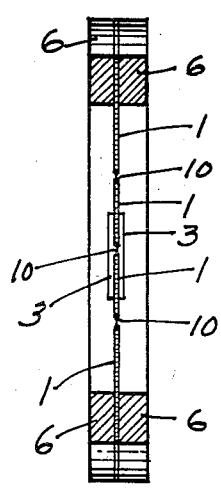
Fig. 12 is a section of Fig. 11 on line f—f.

Referring more particularly to the drawings; 1 designates sectors or ribs of thin flexible material such as paper, or impregnated fabric, or composition, or thin wood or metal or other equivalent. 2 designates a yieldable elastic element consisting of a membrane of elastic material consisting of rubber, rubber cement, elastic cement, or other nonhardening cementing material, interjacent the sectors 1 and interrelated with same. At the point of convergence of sectors 1 or in other words, the apex of the diaphragm are cap members 3 consisting of two thin contiguously formed members located upon opposite sides of the diaphragm and having an aperture 4 through which an actuating rod or armature or other actuating or co-operating means may be secured. Supporting the peripheral edge of the diaphragm is a rigid supporting wall 5 having an opening of substantially the same area as that of the diaphragm. The peripheral edge of the diaphragm is secured between the supporting wall 5 and ring 6 fastened together with screws 7. An arrangement of two rings 6 may be used to support the peripheral edge of the diaphragm as shown in Fig. 12 instead of wall 5. Another method of securing the diaphragm to the supporting wall 5 is to cement or seal the peripheral edge of the diaphragm to the supporting wall 5 and thereby omitting the ring 6.

Figure 2:
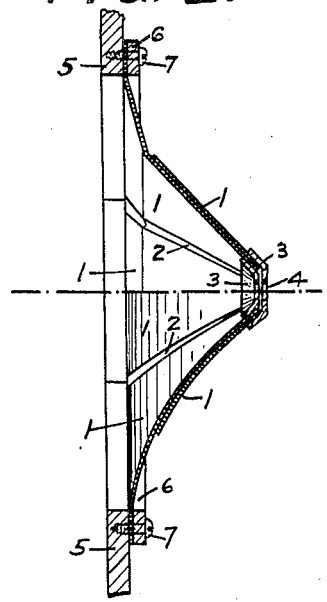
Figure 1:
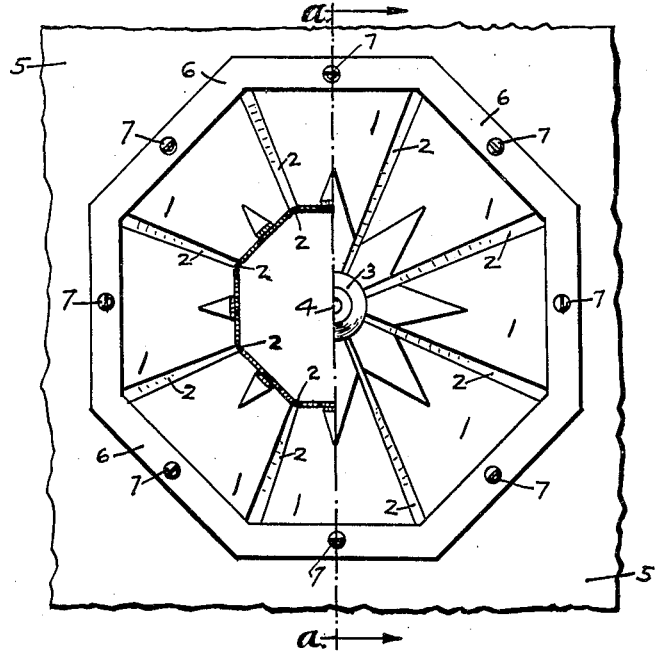
Figure 4:
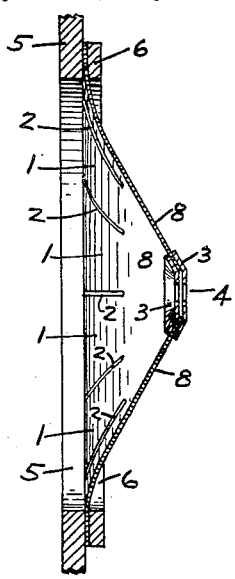
Figure 3:
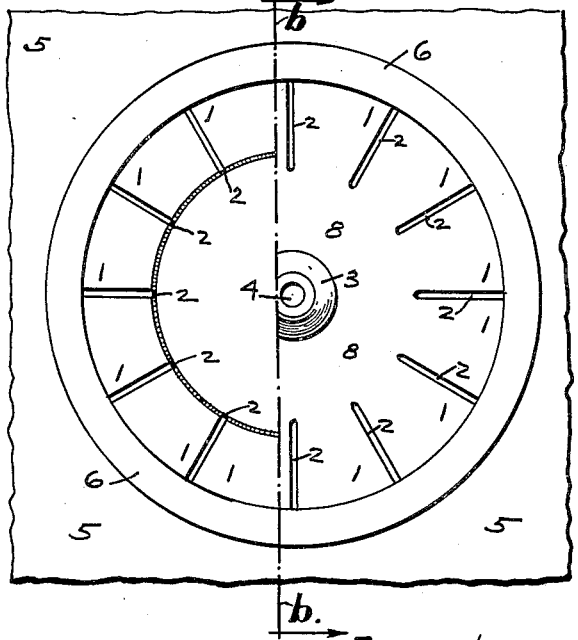

In Figs. 3, and 4, I have shown features of my invention in combination with a conical portion 8 of the diaphragm. In this embodiment the conical or conoidal portion 8 is supported at its periphery by a continuation of its sides as sectors 1 interrelated with yieldable elements 2, forming thus a nonrigid sort of base.

Figure 10:
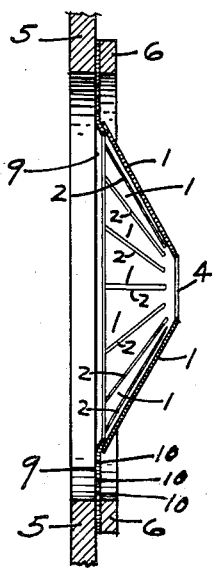
Fig. 10 is a section of Fig. 9 on line e—e.
Figure 9:
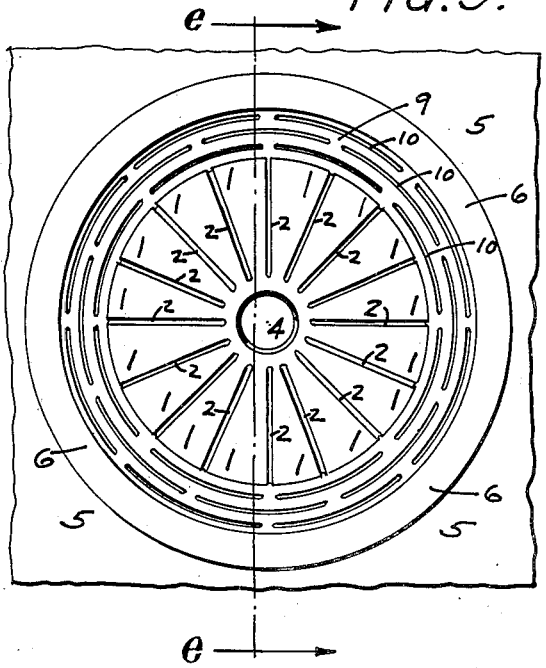
Fig. 9 is a rear view of another embodiment of features of my invention showing a diaphragm constructed of a slitted conical center portion and a slitted flat rim portion.
Figure 11:
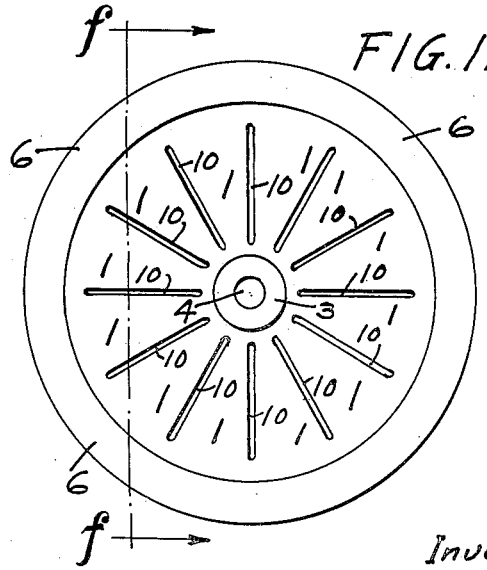
Fig. 11 is a front view of still another embodiment of my invention showing features of same in a disc type diaphragm.

In Figs. 9, and 10, I have shown a diaphragm having a conical center portion which may be slitted as shown, forming sectors 1 radially disposed about the center portion of said diaphragm, interjacently connected by means of yieldable elements 2 interrelated with said sectors, and the outer peripheral edge of said conical portion supported by an annular yieldable plane rim 9, which may be perforated with slits 10, and said slits may be filled with elastic material such as rubber cement, thereby increasing the yieldability of the rim portion of the diaphragm, thus producing a diaphragm which has a conical center which operates against a yieldable rim. In Figs. 11, and 12, I have shown another embodiment of features of my invention in which is incorporated in a vibratile disc diaphragm, slits 10 which are means of dividing the diaphragm into a plurality of strips 1. To prevent the passage of air through the diaphragm, the slits 10 should be quite narrow and filled with some plastic or yieldable material such as rubber cement, and substantially as illustrated in sectional view, Fig. 12. Cap members 3 may be omitted if disc diaphragm is thickened or otherwise reinforced at the center.

In Figs. 15, and 17, the sector portions 1 overlap each other snugly to prevent the passage of air, but not tightly as to prevent the free sliding variation of the amount of lap, which varies with the expansion and contraction of the slitted rim portion of the diaphragm in operation.

In Fig. 16 are shown the stiffer portions 1 of the diaphragm connected by yieldable elements comprising corrugated portion 11 having sides of thinner and more flexible construction than the plane stiffer portions alternate with same in arrangement, thus providing a means of permitting the diaphragm to expand and contract when operated.

In Fig. 18 are shown stiffer portions 1 of diaphragm in alternate arrangement with yieldable elements 2 interjacent said stiffer portions, and said yieldable elements 2 comprising slits closed or filled with elastic material cemented into place. I have found the filling or covering of these slits with rubber cement or liquid rubber or latex or other cementitious elastic material, a preferred means of closing these slits to the passage of air, and permit the diaphragm to yield resiliently with a desirable elastic reactance.

Figure 6:
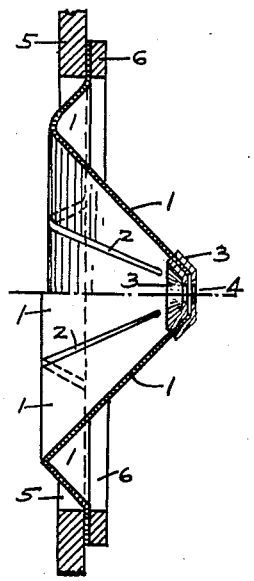
Figure 5:
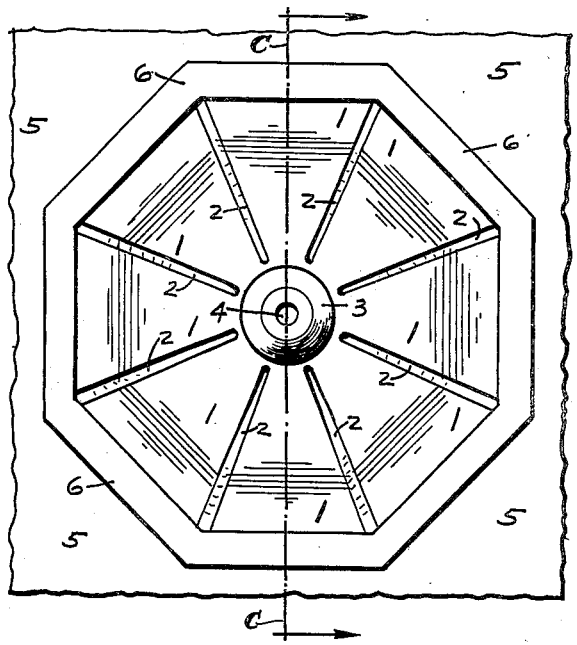

In Figs. 5, and 6, the flexible sector portions are extended forward of the supporting rim plane and then bent back to the rim plane either in a curve as shown in the upper half of Fig. 6, or at an angle as shown in the lower half of Fig. 6. Yieldable elements 2 as described and shown in other parts of this specification permit the expansion and contraction of the diaphragm about the center 3.

Figure 8:
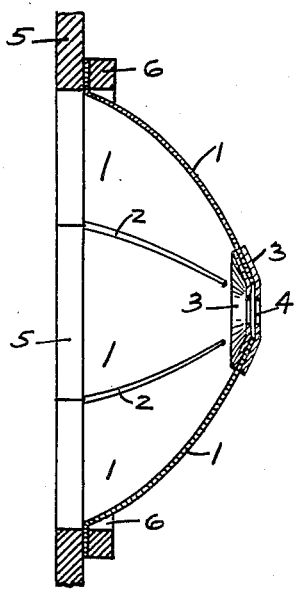
Figure 7:
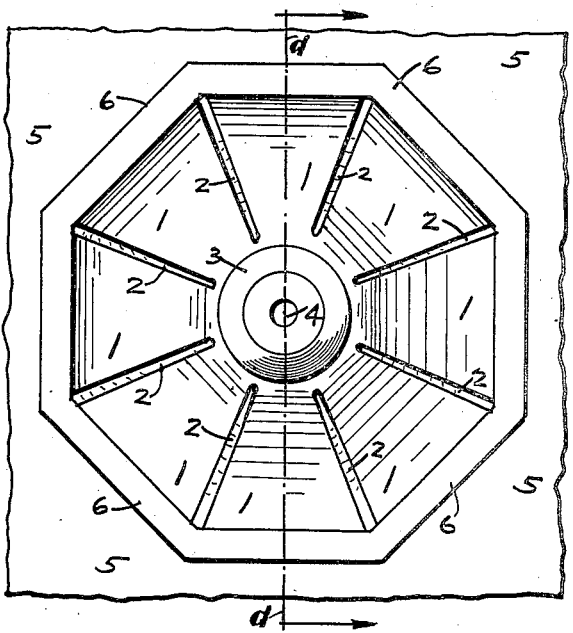

In Figs. 7 and 8 the flexible sector portions 1 are curved outwards in a convex bulge from the center 3 of the diaphragm to the supported rim portion thereof in which are yieldable elements 2 as described elsewhere in this specification.

In Figs. 13 and 14 the flexible sector portions 1 are extended outwards and beyond the opening of the supporting ring 6 and then bent inwardly at a reverse angle to the supporting wall 5 and held in place by ring 6 as shown, and thereby forming an air chamber around the peripheral rim portion. The yieldable elements 2 connecting the sector portions 1 are expansible and contractible, permitting the diaphragm to yield as required.

In Figs. 19 and 20 the diaphragm consists of the cone portion 14 having a free periphery and mounted at the apex to the disc portion 15 of the diaphragm having in same annular slot 16 in which is incorporated a binder of elastic material as shown. The disc portion 15 of the diaphragm is in turn held in place and supported by clamping between annular rings 17 and mounted on dynamic unit 18 in one of several well known ways, and the entire device mounted in box 19 as is customary. In Figs. 21 and 22 the diaphragm consists of the cone portion 14 suspended at its periphery from the flexible rim portion 20 in which open slits 21 permit greater flexibility, and suspended also at the apex from disc portion 22, said disc portion 22 made non rigid by means of annular slot 16 in which is incorporated a binder of elastic material such as rubber or other equivalent. The center disc portion 22 is in turn supported in the well known manner, on and fastened to the center pole piece 23 of the dynamic unit 18. Box 19 encloses and supports the various parts in proper relationship. It is quite obvious that the elastic element 16, provides an elastic support for the diaphragm, and provides an elastic load reactance to electro-magnetic impulses. Although I have shown the elastic element 16, to be continuous, it is also obvious that the same function is obtained if the element 16, is not continuous but that portions of same may be omitted and thus weaken the elastic reactance as desired. In Fig. 21, I have shown the outer portion of disc member 22, connected to diaphragm 14, it is obvious that the outer portion of disc member 22, may be connected at the very apex of the cone diaphragm or directly to the voice coil shown at the apex.

In some of these various modifications shown the yieldability of the diaphragm in a circular or circumferential direction is an essential feature. This feature consisting of annular zones in said diaphragms about the center portion of same, which are provided with means introduced radially for the purpose of eliminating annular constriction.

It is obvious that the division of acoustic diaphragms into a plurality of radial elements need not be confined to the number of radial elements as shown, and that diaphragms having a greater or less number of radial elements than as shown may be equally desirable. It is also obvious that the slits or yieldable elements interjacent the stiffer portions may be longer or shorter than as shown also that these slits need not all be of the same length or disposition but may be of various lengths and disposed in various directions in the same diaphragm.

While I have in this specification disclosed and shown and described several embodiments of my invention it is obvious that my invention is not restricted thereto but is broad enough to cover all structures which come within the scope of the annexed claims.

In the drawings I have shown several acoustic diaphragms as radiate structures having slits or gaps directly radiant from a center portion of said diaphragms. These slits or gaps may with effectiveness be arranged as radiating spirally, or in a helical or spiral direction from the center of actuation in the diaphragm, or these slits may be concentric to the actuated center in the diaphragm, or parallel to the periphery of the diaphragm. Therefore, where in the foregoing I use the term "radial", "radiating", or other similar term it is understood that spirally radial and concentric structures are implied as well as directly radial structures.

Thus from this specification and the accompanying drawings, it is quite evident that my invention consists of improvements in acoustic diaphragms consisting of means for improving the resiliency and elastic reactance of said diaphragms, said means consisting of the incorporation of elastic or yieldable elements or membranes in the surface of said diaphragm, and that these elastic or yieldable elements consist preferably of slit like apertures perforating and piercing the diaphragm, and then closed by means of elastic filling or covering of elastic membrane of rubber, rubber cement, liquid rubber or latex or other similar compound, or any cementitious elastic or yieldable material or compound or other elastic material or elastic cement.

What is claimed is:

1. In an acoustic diaphragm having a dished center portion and a plane rim portion, a plurality of slits and said slits filled with a membrane of elastic cementing material.

2. An acoustic diaphragm having a dished center portion and a plane rim portion, a plurality of slits and said slits filled with rubber cement.

3. An acoustic diaphragm having a dished center portion constructed of a single sheet of material and having a flexibly mounted rim portion, a plurality of slits and in said slits a filling membrane of yieldable cementing material.

4. In an acoustic diaphragm having a dished center portion and a plane rim portion, a plurality of slits and said slits filled with an elastic cementing material.

5. An acoustic diaphragm comprising at least three substantially triangular members of thin vibratile material rigidly secured along one edge and their apices secured together at a junction adapted to be acted upon by a vibratory member, the free edges of said triangular members being adjacent but spaced from each other to allow free individual movement of the triangular members, and in said spaces a filling of elastic cementing material.

6. In an acoustic diaphragm, having a dished center portion constructed of a single sheet of material and having a flexible rim portion, a plurality of slits, and in said slits an elastic membrane of rubber.

7. In an acoustic diaphragm, having a dished center portion constructed of a single sheet of material and a flexibly mounted rim portion, one or more slit apertures, and elastic membrane closing said apertures.

8. In an acoustic diaphragm having a dished center portion and a plane rim portion, a plurality of open slits in said plane rim portion, and said slits substantially parallel to the periphery of said diaphragm.

9. In an acoustic diaphragm having a dished center portion and a plane rim portion, a plurality of slits in said plane rim portion, said slits substantially parallel to the periphery of said diaphragm, and said slits covered with elastic material.

10. In an acoustic diaphragm having a stiff center portion and a flexible rim portion, one or more slit apertures in said rim portion, and said slit apertures closed with elastic material.

11. A diaphragm in an acoustic device, said diaphragm having a dished center portion constructed of a single sheet of material and flexibly mounted at the rim, said diaphragm having one or more slots in same, and in said slots a binder of elastic material.

12. The combination in a diaphragm for an acoustic device consisting of a cone portion, a flexible rim portion, and a disc portion at the apex of the cone portion and in said disc portion one or more slots in which is incorporated a binder of elastic material.

13. In an acoustic diaphragm having a conical center portion and a flexibly mounted rim portion, a means of support restraining the free motion of said diaphragm consisting of one or more elements of elastic material incorporated in a narrow gap intermediate a zone at the apex of said conical center portion and a rigidly supported member, and said elastic elements imposing an elastic restraint to actuating forces applied at said apex.

14. In an acoustic diaphragm actuated by a solenoid voice coil operating in a magnetic field at the center of said diaphragm, an elastic snubber consisting of one or more elastic elements incorporated in a narrow gap intermediate said voice coil and a rigidly supported member, said snubber restraining the free movement of said diaphragm and imposing an elastic restraint to actuating forces at said voice coil.

STEPHEN L. HEIDRICH.